United States Patent
Everett-Church et al.

(10) Patent No.: US 7,200,590 B2
(45) Date of Patent: Apr. 3, 2007

(54) DATA SHARING

(75) Inventors: Justin Everett-Church, Fremont, CA (US); Christopher Tzann-en Szeto, Santa Clara, CA (US)

(73) Assignee: Yahoo! Inc., Sunnyvale, CA (US)

(*) Notice: Subject to any disclaimer, the term of this patent is extended or adjusted under 35 U.S.C. 154(b) by 334 days.

(21) Appl. No.: 10/729,860

(22) Filed: Dec. 5, 2003

(65) Prior Publication Data

US 2005/0267870 A1 Dec. 1, 2005

Related U.S. Application Data

(63) Continuation-in-part of application No. 09/930,878, filed on Aug. 15, 2001, and a continuation-in-part of application No. 10/613,985, filed on Jul. 2, 2003.

(60) Provisional application No. 60/523,844, filed on Nov. 19, 2003.

(51) Int. Cl.
*G06F 17/00* (2006.01)

(52) U.S. Cl. ............................................. 707/3; 707/4

(58) Field of Classification Search ............ 707/3, 707/4, 5, 6, 104.1; 709/204; 715/758
See application file for complete search history.

(56) References Cited

U.S. PATENT DOCUMENTS

| | | | |
|---|---|---|---|
| 5,220,657 A | 6/1993 | Bly et al. | 711/152 |
| 5,880,731 A | 3/1999 | Liles et al. | 715/758 |
| 6,237,025 B1 | 5/2001 | Ludwig et al. | 709/204 |
| 6,301,609 B1 | 10/2001 | Aravamudan et al. | 709/207 |
| 6,430,602 B1 | 8/2002 | Kay et al. | 709/206 |
| 6,487,583 B1 * | 11/2002 | Harvey et al. | 709/204 |
| 6,493,724 B1 | 12/2002 | Cusack et al. | 707/104.1 |
| 6,539,421 B1 | 3/2003 | Appleman et al. | 709/206 |
| 6,564,246 B1 | 5/2003 | Varma et al. | 709/205 |
| 6,564,249 B2 | 5/2003 | Shiigi | 709/206 |
| 6,611,814 B1 | 8/2003 | Lee et al. | 705/26 |
| 6,651,053 B1 | 11/2003 | Rothschild | 707/3 |
| 6,677,976 B2 | 1/2004 | Parker et al. | 348/14.08 |
| 6,747,970 B1 | 6/2004 | Lamb et al. | 370/352 |
| 6,760,580 B2 | 7/2004 | Robinson et al. | 455/412.2 |
| 6,781,608 B1 * | 8/2004 | Crawford | 715/758 |
| 6,807,565 B1 | 10/2004 | Dodrill et al. | 709/206 |
| 6,816,884 B1 | 11/2004 | Summers | 709/206 |
| 6,907,447 B1 | 6/2005 | Cooperman et al. | 709/203 |
| 6,980,983 B2 | 12/2005 | Banerjee et al. | 707/3 |
| 6,983,370 B2 | 1/2006 | Eaton et al. | 713/182 |
| 7,028,262 B2 | 4/2006 | Estrada et al. | 715/751 |
| 2003/0041108 A1 | 2/2003 | Henrick et al. | 709/205 |
| 2003/0101235 A1 | 5/2003 | Zhang | 709/218 |
| 2003/0208545 A1 | 11/2003 | Eaton et al. | 709/206 |
| 2004/0117443 A1 | 6/2004 | Barsness | 709/204 |

(Continued)

OTHER PUBLICATIONS

Glencoe.com; Instant messaging: Convenient Chatting and Corporate Battling, 1999, pp. 1-5.*

(Continued)

*Primary Examiner*—Apu M. Mofiz
(74) *Attorney, Agent, or Firm*—Hickman Palermo Truong & Becker LLP

(57) ABSTRACT

A technique for sharing data is disclosed. The technique comprises performing a search in a first application to obtain a first search result, transferring search data associated with the search to a second application, and providing, in the second application, a second search result based on the search data.

21 Claims, 13 Drawing Sheets

U.S. PATENT DOCUMENTS

2004/0215731 A1  10/2004  Tzann-en Szeto ........... 709/207
2005/0086211 A1   4/2005  Mayer ........................... 707/3

OTHER PUBLICATIONS

Notification of Transmittal of the International Search Report and the Written Opinion of the International Searching Authority, or the Declaration as received in corresponding PCT International application No.: PCT/US2004/038354.

http://corp.odigo.com/products/clients Web Page.

http://www.apple.com/quicktime/ Web Page.

International Searching Authority, "Notification of the Transmittal pf the International Search Report and the Written Opinion of the International Searching Authority, or the Declaration," PCT/US04/21209, dated Aug. 9, 2005, 9 pages.

Current Claims, PCT/US04/21209, 5 pages.

* cited by examiner

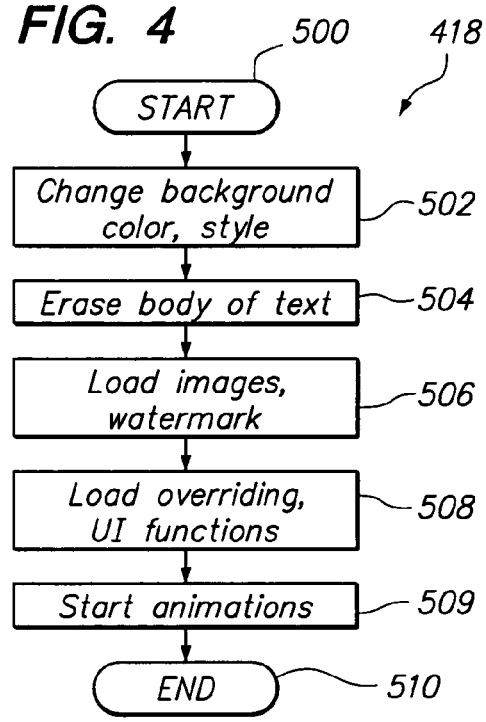
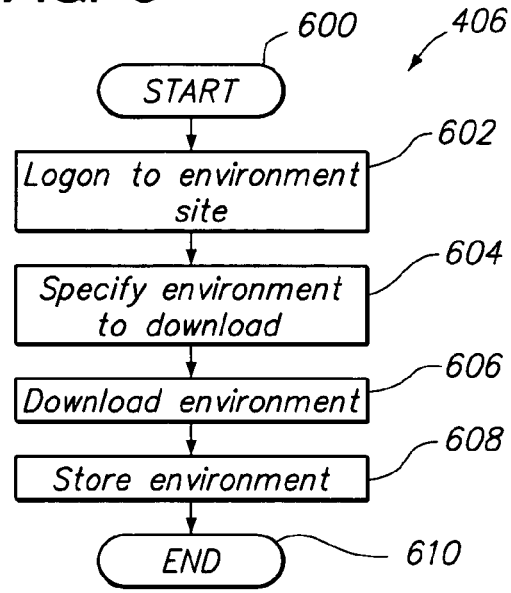
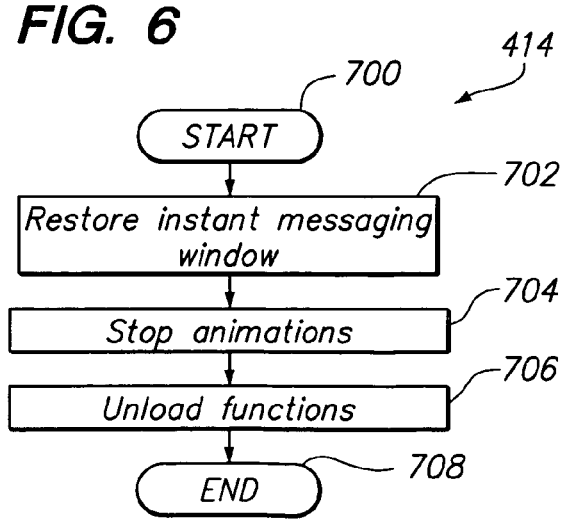

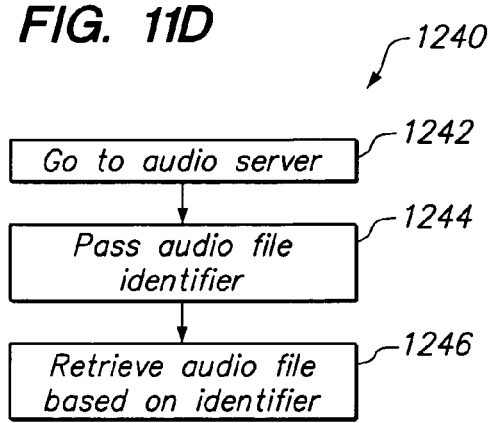
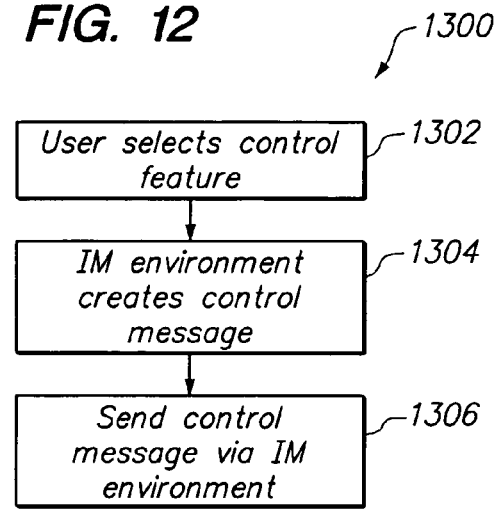
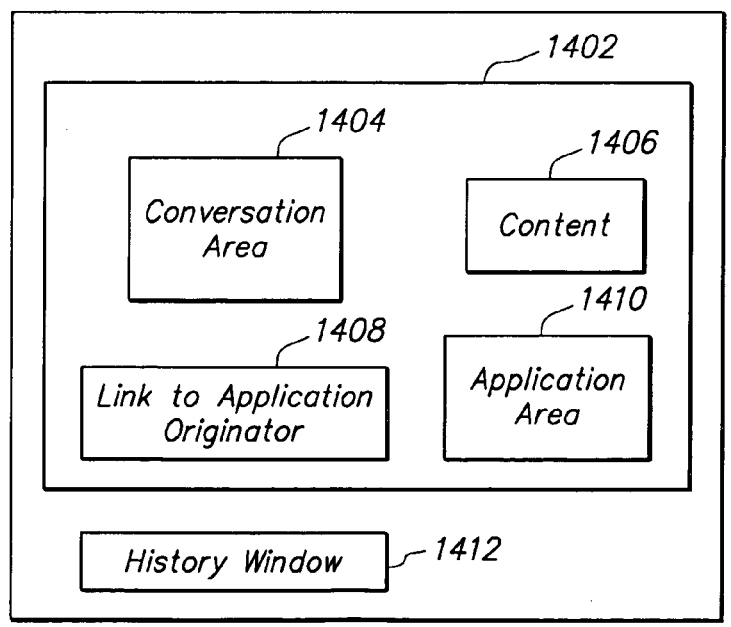

DATA SHARING

CROSS REFERENCE TO RELATED APPLICATIONS

This application claims priority to U.S. Provisional Patent Application No. 60/523,844 entitled DATA SHARING filed Nov. 19, 2003 which is incorporated herein by reference for all purposes.

This application is a continuation in part of co-pending U.S. patent application Ser. No. 09/930,878 entitled SHARING AND IMPLEMENTING INSTANT MESSAGING ENVIRONMENTS filed Aug. 15, 2001, which is incorporated herein by reference for all purposes; and U.S. patent application Ser. No. 10/613,985 entitled MESSENGER-CONTROLLED APPLICATIONS IN AN INSTANT MESSAGING ENVIRONMENT filed Jul. 2, 2003, which is incorporated herein by reference for all purposes.

FIELD OF THE INVENTION

The present invention relates generally to data exchange. More specifically, a technique for sharing data between two or more users is disclosed.

BACKGROUND OF THE INVENTION

Instant messaging has become one of the most popular applications on the Internet. Instant messaging programs generally allow users to send and receive messages. The messages are typically generated and displayed by an instant messaging client on each end and an instant messaging server may perform various functions to facilitate the transfer of messages for communication or conversation.

Software intended for implementing an instruction set in an instant messaging environment may be generally referred to as an instant messenger (IM) application. Existing IM applications typically allow limited data exchanges such as the exchange of text messages. It would be desirable if the users could share more information about themselves via IM applications in an interactive and cooperative way. It would also be useful if the users were not restricted to viewing exactly the same content such as the same web pages while sharing the information.

BRIEF DESCRIPTION OF THE DRAWINGS

Various embodiments of the invention are disclosed in the following detailed description and the accompanying drawings.

FIG. 4 is a flow chart illustrating in further detail a process that is executed when the start function is called in step 418 of FIG. 3;

FIG. 5 is a flow chart illustrating a process implemented to load an environment as shown in step 406 of FIG. 3;

FIG. 6 is a flow chart illustrating a process implemented to clean up an old environment;

FIG. 11D illustrates another exemplary flow chart for implementing a messenger-controlled IM application such as an audio file (e.g., song, recording, etc.);

FIG. 12 is a flow chart illustrating an exemplary IM application control process in accordance with one embodiment of the present invention;

FIG. 13A is an exemplary user interface for controlling IM applications in accordance with one embodiment of the present invention;

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1:
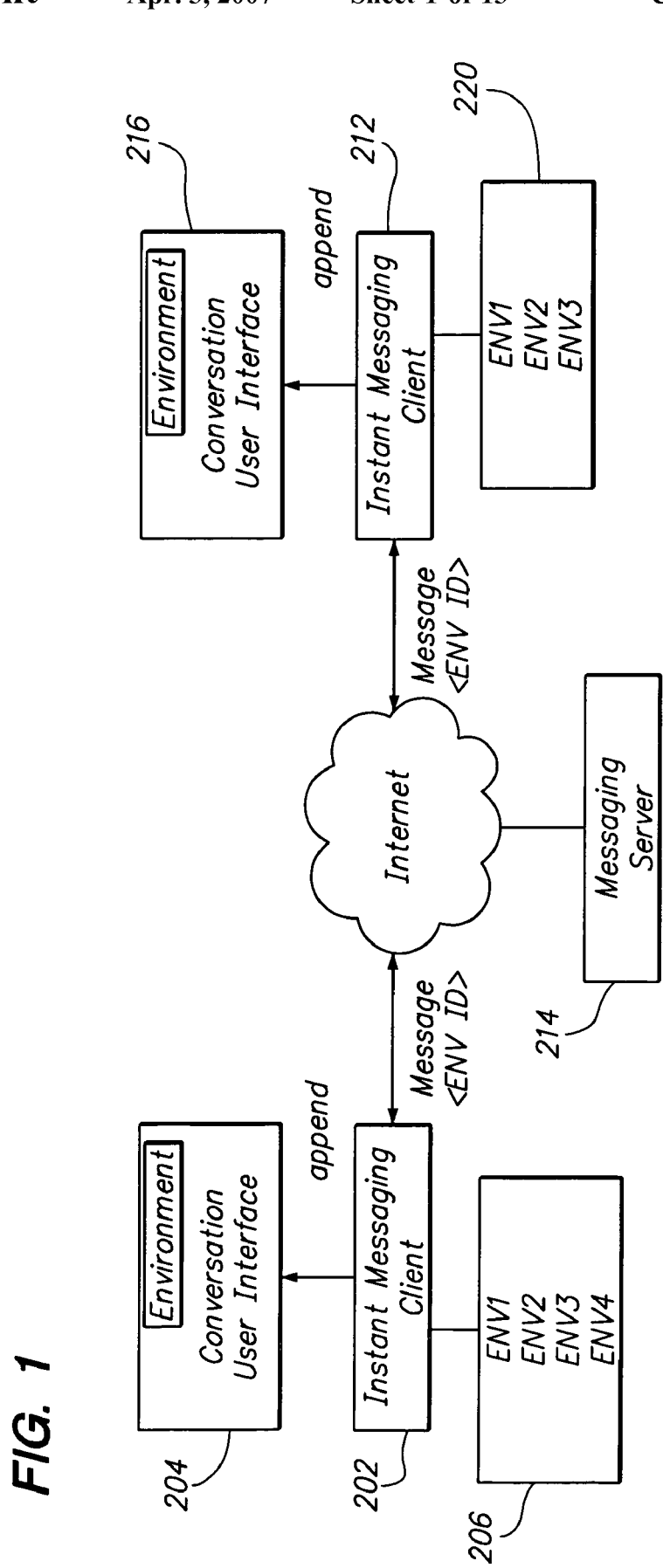
FIG. 1 is a block diagram illustrating an instant messaging system that implements instant messaging environments stored by instant messaging applications.

An instant messaging environment is a shared environment which exists between 2 or more instant messaging users. FIG. 1 is a block diagram illustrating an instant messaging system that implements instant messaging environments stored by instant messaging applications. It should be noted that, while this description refers extensively to instant messaging environments, the disclosed environments are also applied to other messaging systems. In general, an instant messaging system refers to any real time or near real time messaging or information exchange system. Many such systems will buffer messages sent to a participant who is temporarily unavailable or offline. A notification may be sent to the participant. An instant messaging environment may be specified by one instant messaging application to change the environment or state of another instant messaging application. A first instant messaging client, 202 interacts with a conversation user interface 204 that displays information to and receives messages from a user.

It should be noted that the term "application" as used herein is intended to refer to any client application, server application, distributed application, self contained application or combination thereof. An application may be implemented in any appropriate manner, including being embedded in a chip or being loaded into memory or firmware.

In some embodiments, the conversation user interface includes a conventional instant messaging window as shown in FIG. 1 with a history window for displaying previous messages and a new message window for composing new messages. In other embodiments, the conversation user interface may be dramatically different. For example, in one embodiment, the conversation user interface of the history window is modified to resemble a cartoon interface that shows the participants in instant messaging as comic characters or avatars having a conversation with text bubbles used to list messages back and forth. The conversation user interface may also include multiple history windows and other menus associated with instant messaging features such as buddy lists, formatting options, etc. Instant messaging environments as described herein may generally be applied to any type of conversation user interface used to display and author messages.

User interface commands are transferred from the instant messenger client to the conversation user interface to cause the conversation user interface to display instant messages and their corresponding environment to the user. For example, an append command is used to send a new message received from another instant messaging application to the conversation user interface. The append command may simply cause the received message to be added to a history window if a generic environment is selected. It should be noted that the phrase "user interface commands" as used herein is intended to encompass any functions, behaviors, actions, capabilities, etc. that are features of the user interface or the instant messaging window.

Other instant messaging environments may cause the append command to behave in different manners. For example, in the cartoon instant messaging environment, the append command would cause the last text bubble generated for the character corresponding to the message sender to disappear and for a new text bubble containing the current message to be created. Thus, the selected environment affects the state of the instant messaging application so that a user interface command specified by the instant messaging client may have different effects depending on the selected environment. A number of different environments may be stored in a cache 206.

In discussing the example shown, for the purpose of explanation, instant messaging client 202 will be described as sending a message to instant messaging client 212. In general, the two instant messaging clients will both send and receive messages in turn. Instant messaging client 202 sends a message that includes an environment identifier along with the message over the Internet. Throughout this specification, the Internet is referred to as a medium over which messages are sent. The disclosed system also operates over any other appropriate network or internetwork including wireless networks, proprietary networks, intranets, local area networks, or wide area networks. In one embodiment, instant messaging server 214 receives a message, processes the message and transfers the message to instant messaging client 212. In other embodiments, a peer to peer messaging system is implemented in which an instant messaging server need not necessarily become involved in transferring messages between instant messaging clients.

If a messaging server does process messages, then the messaging server may perform certain checks to determine whether the environment identifier as specified along with the message corresponds to a valid environment. In some embodiments, environments may expire as a result of a sponsorship or other type of agreement to maintain the environment lapsing.

The message along with the environment identifier is received by instant messaging client 212. Instant messaging client 212 also stores in a cache 220 various environments that it has obtained in the past. Instant messaging client 212 searches the cache for an environment that corresponds to the environment identifier received from instant messaging client 202. If a corresponding environment is found, then instant messaging client 212 changes the environment currently implemented by it.

The current environment affects how user interface commands sent from instant messaging client 212 to conversation user interface 216 are processed. In one embodiment, the instant messaging client may check whether or not an environment has expired before it implements that environment. If an environment has expired, then the instant messaging client may retrieve an updated environment from the instant messaging server or another specified source via the network.

Figure 2:
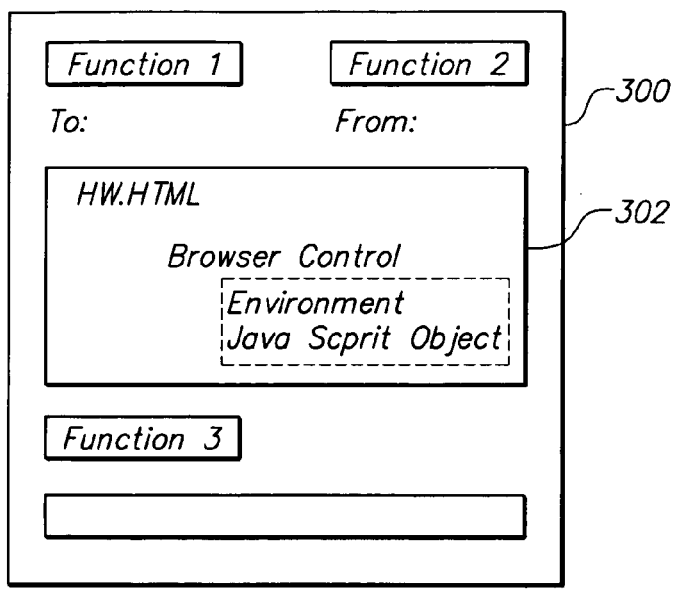
FIG. 2 is a diagram illustrating how an instant messaging environment is implemented using a browser control window.

FIG. 2 is a diagram illustrating how an instant messaging environment is implemented using a browser control window. It should be noted that a browser control window as used herein is intended to refer to any program control or set of controls that can interpret and render scripted pages. Also, any other appropriate system for rendering information may be used. Instant messaging window 300 is configured in a similar manner as a conventional instant messaging window with a TO field, a FROM field, and various function and menu buttons surrounding a history window 302. However, history window 302 is implemented in an unconventional manner. History window 302 is implemented using code in a browser control that processes an HTML file which contains the formatting for the history window and controls the appearance of the instant messaging cache that appears therein.

In one embodiment, the instant messaging environment is implemented by loading into memory one or more JavaScript objects that implement methods and behaviors that override the history window's default methods and behaviors. Of course, objects may be written in any appropriate programming language or system, such as ActiveX. In another embodiment, an Iframe that is not visible to the user includes JavaScript that implements the instant messaging environment. For example, if a message is received by the instant messaging client and an append function is called to add that message to the history window, then the environment embedded in the JavaScript code alters the way the browser control processes the append function. For example, the JavaScript may include a different version of the append function that causes text to be appended in a different manner than it would normally be appended if no environment were implemented by the code in the browser control. It should be noted that loading a JavaScript object without using an Iframe is generally preferred over the Iframe implementation for the sake of speed. This description refers to both implementations and it should be noted that when one implementation is referenced, that the other implementation (or any reasonable alternative implementation) may be used in different embodiments.

Once the code in the browser control has executed the modified append function contained in the environment, the environment may either allow the normal append function to be subsequently executed or may indicate that the normal append function should not be executed, essentially replacing the normal append function with the modified version. For example, an environment may cause a sound or visual effect to occur every time a new line is appended to the history window. In such a case, the environment would cause the browser control upon receiving the append function to first execute some JavaScript that would play the sound or create the visual effect and then return to the normal append function for the text to be appended in a conventional manner. In another example, such as the one described above where the history window includes cartoon characters and text bubbles that contain the appended text, the normal append function would be replaced by the append function contained in the environment and the normal append function would not be called upon completion of the executed environment code.

Thus, implementing code in a browser control within an instant messaging window that renders an HTML allows user interface commands to be redefined. Different environments are stored simply as different sets of code. The JavaScript contained in the environment redefines certain commands or functions by executing additional commands and then either calling or not calling the original function as desired.

It is important to note that, while the above described JavaScript code implementation of instant messaging environments has significant advantages, it is by no means the only manner in which instant messaging environments are implemented. In different embodiments, instant messaging environments are implemented by using different code structures. In general, a certain set of code representing the environment is accessed by the instant messaging application. The set of code is loaded in response to the specification of an instant messaging environment identifier by another instant messaging application. The environment may also be specified by the user of the application. By way of example and without limitation, instant messaging environments may be implemented using the wireless application protocol, XML, VRML, or any other appropriate public or private standard.

The specified environment alters the response of the instant messaging application to actions performed by the user. As shown in FIG. 1, in one embodiment, this alteration occurs by redefining commands or functions sent from the instant messaging client to the conversation user interface. As explained further in FIG. 2, in one embodiment, this may be implemented by using a browser control to render a history window and loading a JavaScript object that includes the function definitions. It should be apparent that many alternatives exist for implementing this system in a similar manner.

As a further example, another function that may be redefined is the scroll function. The user may indicate by dragging the mouse over an arrow button in the instant messaging window or by some other convenient means that he would like to scroll the history window. When such a scroll command is received, then a check is first made to determine whether or not the scroll command has been redefined by a loaded environment. For example, an environment may contain a watermark that is intended to always show up in the history window. In such a case, the scroll function would be redefined so that the watermark does not scroll within the window while the rest of the text inside the window does scroll.

As shown in FIG. 1, environment identifiers are passed between instant messaging applications by including an environment identifier along with each message.

In one embodiment, there is a default environment identifier that is automatically passed between instant messaging applications if no environment has been specified by either of the users. Once one of the users specifies an environment, if the other user accepts the environment then that user will then pass the accepted environment identifier back to the user that originally specified the environment identifier, thus maintaining the environment. Environments may be selected by users in a variety of ways. For example, audio or video user inputs may be processed or used to select or modify an environment. Also, a robot or other program communicating with a user may select or modify an environment. Other context information about the user's system, a specified default environment or set of environments, or message content may select or modify an environment. One environment may select or modify another environment and a central instant messaging server may itself specify or modify an environment.

If an instant messaging application passes an environment identifier that is not accepted by the receiving instant messaging application, then the receiving instant messaging application will send back the default environment identifier and the sending instant messaging application may either change back to the default environment or maintain its own environment according to how it is configured. Thus, the instant messaging environment is either maintained or changed with each message passed back and forth containing an environment identifier.

Figure 3:
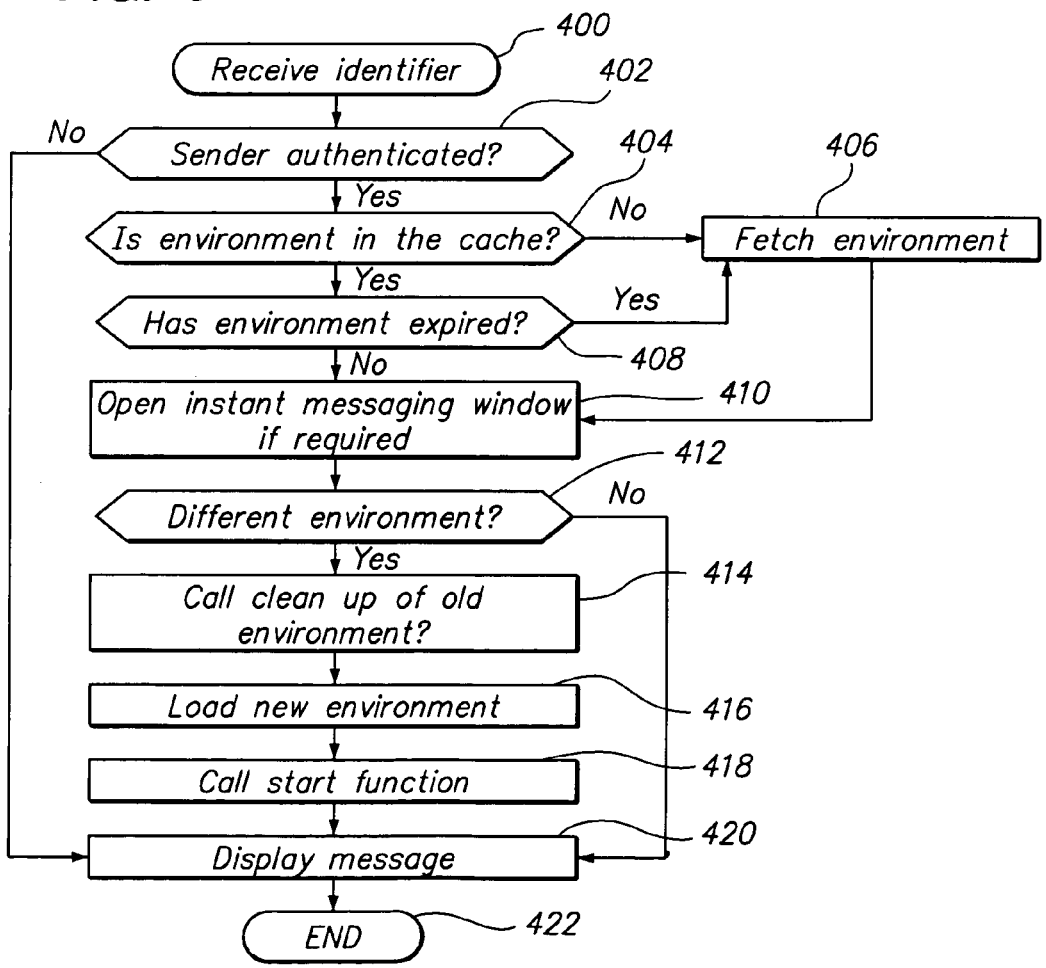
FIG. 3 is a flow chart illustrating a process executed by an instant messaging application when an environment identifier is received.

FIG. 3 is a flow chart illustrating a process executed by an instant messaging application when an environment identifier is received. The environment identifier is received in step 400. Next, in step 402, it is determined whether the sender of the identifier is an authorized sender. In one embodiment, this is determined by whether the sender is a member of a buddy list or other list maintained by the receiver of parties eligible to send environment identifiers and change the environment of the recipient's instant messaging application. If the sender is not authorized, then control is transferred to step 420 and the message is displayed.

If the sender is authorized, then control is transferred to step 404 and it is determined whether the environment is already cached by the receiving instant messaging application. If the environment is not cached by the receiving instant messaging application, then control is transferred to a step 406 where the environment is fetched. In one embodiment, the environment is loaded by accessing a website that makes environments available for download. The environment identifier may be sent to the website to identify the environment to be downloaded. In other embodiments, the environment may be obtained from the sender and an authentication code or signature may be used to verify the integrity of the environment. Once the environment is downloaded, then control is transferred to step 410. If the environment is in the cache, then control is transferred from step 404 to step 408 and it is determined whether the environment has expired.

In one embodiment, environments that are not found in a local cache are obtained from a secure source, such as a trusted website. This secure mode of distribution prevents parties from using environments for hostile purposes. Since instant messaging participants merely refer to environments and the referred to environments are separately obtained from a trusted source, participants do not intentionally or inadvertently send damaging environments to each other.

In one embodiment, whenever an environment is downloaded by an instant messaging application, an expiration date is also provided to the instant messaging application so that the instant messaging application can determine if the environment has expired. In another embodiment, the instant messaging application is required to always check with an instant messaging server to determine whether an environment has expired before that environment is implemented.

If the environment has expired, then control is transferred to step 406 and the environment is loaded. If the environment has not expired, then control is transferred to step 410 and an instant messaging window is opened if an instant messaging window is currently not open. Control is then transferred to step 412 where it is determined whether a different environment has been specified by the received environment identifier. If a different environment has not been specified, then the currently loaded environment may continue to be used and control is transferred to step 420 where the message is displayed.

If the environment is different, then control is transferred to step 414 and a clean up function is called for the old environment. Control is then transferred to step 416 and the new environment is loaded into memory. Next, in step 418, the start function is called for the new environment so that any code that should be executed when the new environment is loaded is executed. Control is then transferred to step 420 and the message is displayed. The process ends at 422.

In one embodiment, an environment is downloaded from a website by receiving a series of different types of files. The first type of file is an initialization file that contains information regarding the environment that the instant messenger application can access without actually loading the environment. The initialization file may contain items such as a display name that determines how the environment will be listed in a formatting tool bar used to select environments and an expiration that can be used by the instant messaging application to determine that the environment is invalid and initiate a download of an updated version of the environment.

The second type of file is the actual environment program file that contains, in one embodiment, encoded JavaScript that defines how the environment looks and behaves. The third type of file generally downloaded is media file such as an image file, video clip, animation, sound clip, etc. that provides images or other media that are generally used by the environment. In different embodiments, the different types of files are encrypted or compressed either together or separately and encapsulated or signed as is deemed appropriate. The files may be sent together using the .zip or the .cab or other archive or compression format, if desired. Preferably, at least the JavaScript objects are encrypted.

FIG. 4 is a flow chart illustrating in further detail a process that is executed when the start function is called in step 418 of FIG. 3. The process begins at 500. In step 502, the background, color and style of the instant messaging window is changed to the background, color and style of the environment that has been selected. In step 504, the body of text is erased. It should be noted that in some environments, the body of text may not be erased but in other environments the body of text may need to be erased. For example, in the cartoon environment shown above, only the current message being conveyed is shown in a text bubble. Next, in step 506, any images and watermarks associated with the environment are loaded. Then, in step 508, any overriding user interface functions are loaded so that when a user interface command is received, the function called by the command may be changed to the function specified by the instant messaging environment. In step 509, any animations (such as falling snowflakes as shown below) associated with the environment are started. The process ends at 510.

FIG. 5 is a flow chart illustrating a process implemented to load an environment as shown in step 406 of FIG. 3. The process starts at 600. In a step 602, the application logs on to a website that includes environments available for download. In step 604, the application specifies an environment to be downloaded. In one embodiment, the same environment identifier used by applications to identify environments to each other is used to identify an environment to download. In a step 606, the environment is downloaded. The environment is stored in step 608. The process ends at 610.

Requiring that the instant messaging environment be downloaded from one or more central sites enables editorial control to be exercised over the environments that are sent to users. Obscene environments or other undesirable environments can be avoided. Also, viruses and other malicious code can be excluded. In certain embodiments, users may be allowed to create environments and send them to other users, but it is an important feature that in some embodiments, there is at least one mode where environments are only downloaded from a trusted or controlled source that ensures security and, if desired, some control over content. One important use of instant messaging environments is advertising. When an instant messaging environment includes an ad, controlling the source of the environment facilitates tracking of the environment use as well as making sure that the environment is not altered.

It should be noted that when the environment is downloaded, data in the initialization file for the environment may be separately stored in a table or system registry so that information about loaded environments may be readily accessed by the instant messaging application without opening files. For example, if an expiration date is associated with the environment, then that date may be written into an expiration table so that the instant messaging application can periodically perform clean up and delete expired environments or check before an environment is accessed whether or not it has expired. Likewise, the names of various download environments may be stored in a single table used to create a list of environments for a menu that facilitates the selection of environments by a user.

FIG. 6 is a flow chart illustrating a process implemented to clean up an old environment. The process starts at 700. In a step 702, the instant messaging window is restored to a default state. That may involve, for example deleting a watermark created by the old environment. The default state may include a default background color, font, style, etc. In step 704, any animations or other routines are stopped. In a step 706 redefined functions that replace user interface commands are unloaded. The process then ends at 708. It should be noted that other clean up operations may typically be included in a clean up process.

Figure 7:
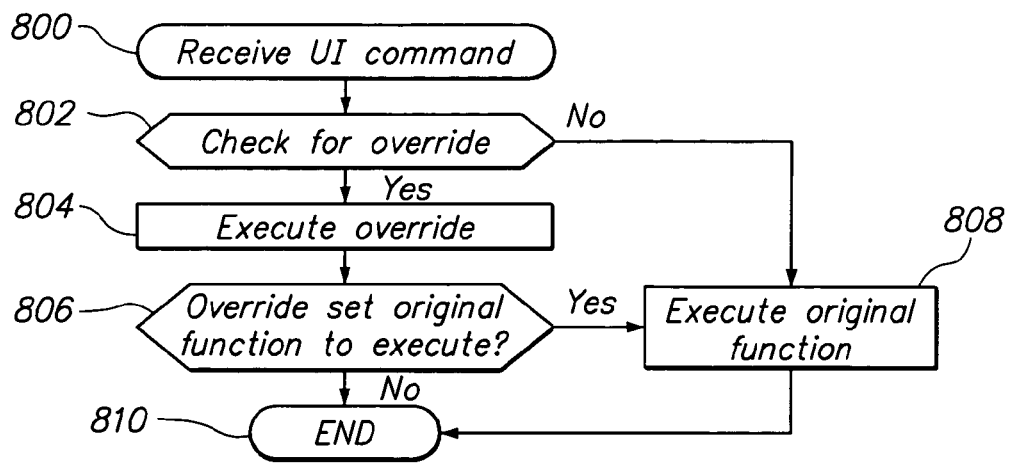
FIG. 7 is a flow chart illustrating a process executed by the instant messaging application in response to a user interface command.

FIG. 7 is a flow chart illustrating a process executed by the instant messaging application in response to a user interface command. The process starts at 800 when the user interface command is received. In step 802, it is determined whether an overriding or modified function has been defined by the currently loaded environment. If no overriding function is defined, then control is transferred to a step 808 and the original function is executed. If an overriding or modified function does exist, then control is transferred to step 804 and the overriding function is executed. Control is then transferred to a step 806 where it is determined whether the overriding function has set the original function to execute once it has been completed. If the original function is to execute, then control is transferred to step 808 and the original function is executed. If the original function is not to be executed, then control is transferred to step 810 and the process ends.

Sending environment identifiers between instant messaging applications and using the environment identifiers to change the environment of a receiving application has been described. Once this capability of redefining user interface command functions, executing animations and creating event driven actions to occur in an instant messaging window has been enabled, a rich variety of environments can be defined for instant messaging applications. Some examples of instant messaging environments that may be created are provided in FIGS. 9A through 9C.

Figure 8A:
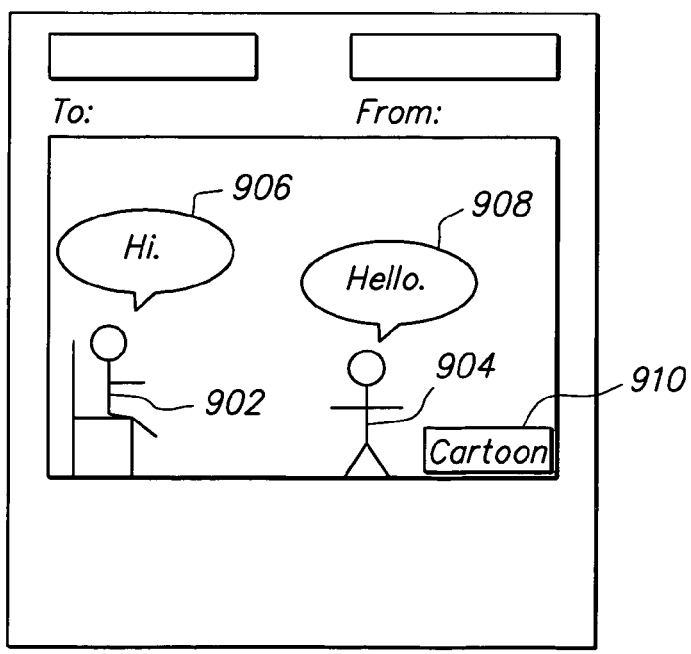
FIG. 8A is a diagram illustrating a cartoon instant messaging environment.

FIG. 8A is a diagram illustrating a cartoon instant messaging environment such as the one described above. Characters 902 and 904 represent participants in the instant messaging session and text bubbles 906 and 908 display the last message sent by each of the participants. This environment is implemented by redefining the append function to delete an existing text bubble above the character representing the sender of the text message and then insert the message being sent into a new text bubble. In addition, the start function of the environment deletes all text in the history window and draws in the characters that are part of the cartoon. In addition, a watermark 910 is provided that shows the name of the cartoon that is the theme of the environment. In many embodiments, the watermark also functions as a link so that a user may link to a website related to the environment. This technique is especially useful when the environment is part of an ad campaign.

The instant messaging server may track statistics about environments for various reasons. For example, if an environment has an advertisement theme associated with it, then each time the environment is specified by a user to another user that event may be counted by the server so that ad revenue can be generated. In addition, when certain functions within the environment are called as a result of events, the instant messaging server may record such occurrences as well and those events may also generate ad revenue.

Figure 8B:
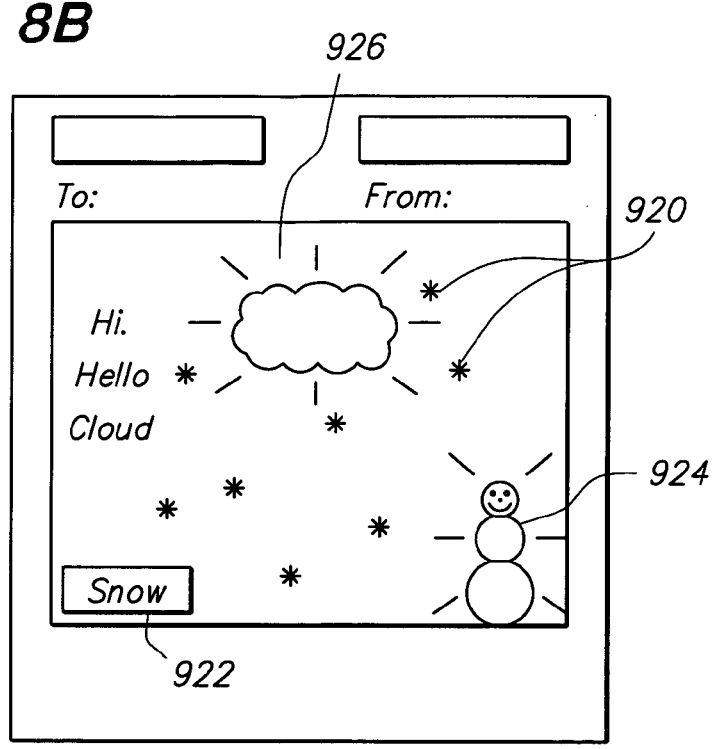
FIG. 8B is a diagram illustrating an environment where a snow theme has been implemented.

FIG. 8B is a diagram illustrating an environment where a snow theme has been implemented. Animated snowflakes 920 fall down the window so long as the environment is active. In addition, a watermark 922 is present that provides a link to a site related to snow. Also, when the ring or buzzer function is called by one of the users, then instead of the general ringing, a snowman 924 appears and flashes. Also, when certain text is typed in the window such as the word cloud, a cloud 926 appears.

Figure 8C:
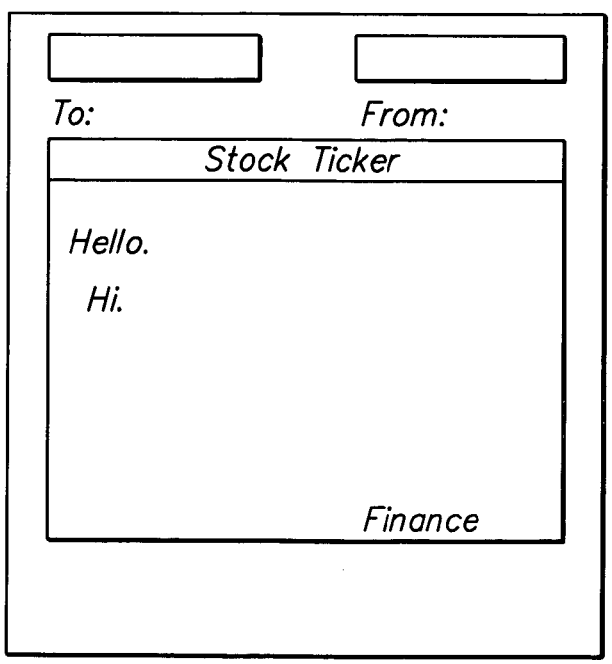
FIG. 8C is a diagram illustrating another environment where the ability of an environment to interact with another application is illustrated.

FIG. 8C is a diagram illustrating another environment where the ability of an environment to interact with another application is illustrated. In the environment shown, a stock ticker obtains information from either the instant messaging program, a browser, or other program that makes stock information available to user. In addition, the environment includes a finance watermark link that directs the user to a financial site. In this environment, when the environment is loaded, a function is periodically executed that checks for data from the stock ticker application. In addition, environments can communicate information to other environments by sending messages. Also, environments can read certain information available to a messenger program such as a buddy list or in some cases stock quote information.

Figure 9A:
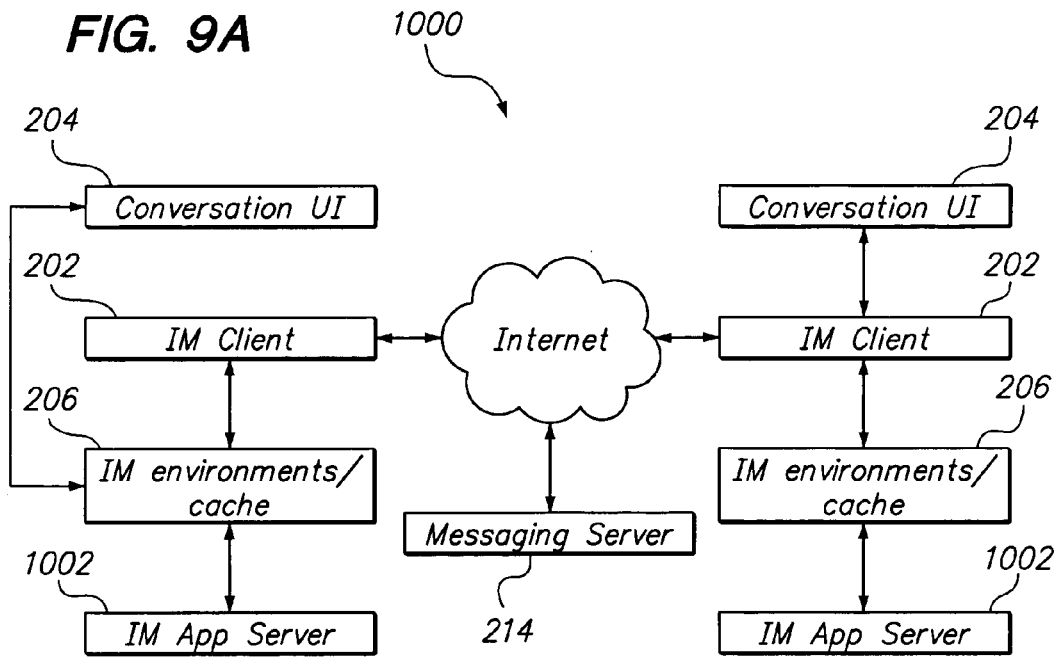
FIG. 9A is a diagram illustrating an exemplary instant messaging system that implements messenger-controlled applications.

FIG. 9A is a diagram illustrating an exemplary instant messaging system 1000 that implements messenger-controlled applications. Messenger-controlled applications may also be referred to generally as instant messaging or IM applications. As described above in connection with FIG. 1, instant messaging (IM) clients 202 are shown using the Internet for transferring data. Clients, referring to end user applications or instant messaging user applications, provide an implementation environment for messenger-controlled or IM applications. Conversation user interfaces (UI) 204 provide users with interfaces for creating, reviewing, editing, or modifying content to send between IM clients 202. In the embodiment shown, an IM application may be executed between IM clients 202 using an IM message. This will be described in further detail below. As described in FIG. 1, IM environments are stored in cache 206. Also provided are IM application servers 1002 for implementing IM applications as will be described below. Also generally, an IM application is any application implemented in an instant messaging environment.

Figure 9B:
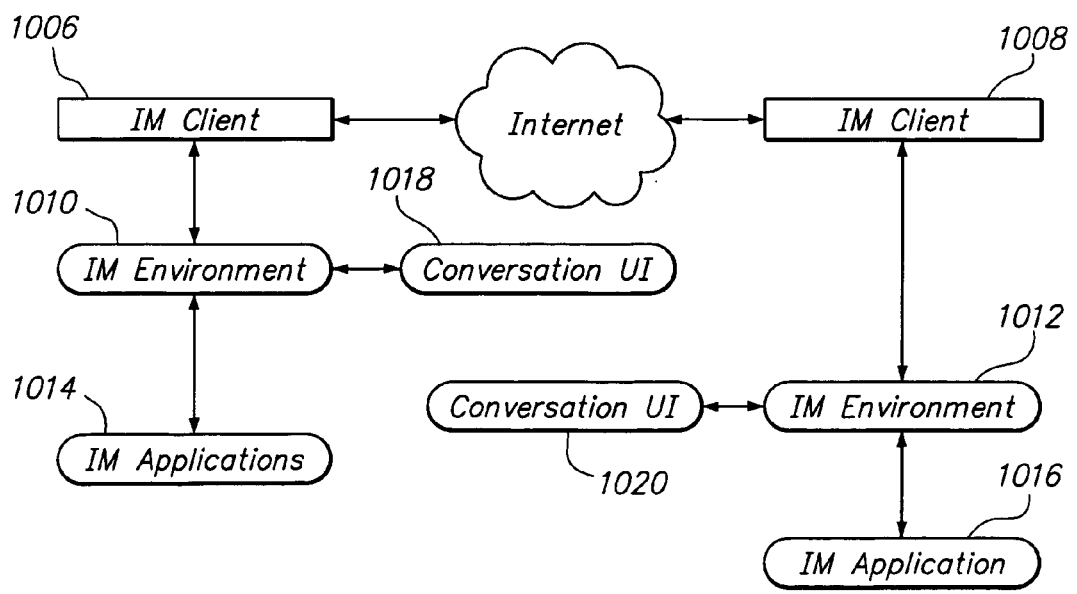
FIG. 9B is a diagram illustrating an alternative embodiment of an instant messaging system.

FIG. 9B is a diagram illustrating an alternative embodiment of an instant messaging system. Also communicating over the Internet, IM clients 1006, 1008 implement IM environments 1010, 1012. IM applications 1014, 1016 can be implemented over IM environments 1010, 1012. An IM session is executed using conversation interfaces 1018, 1020.

Figure 9C:
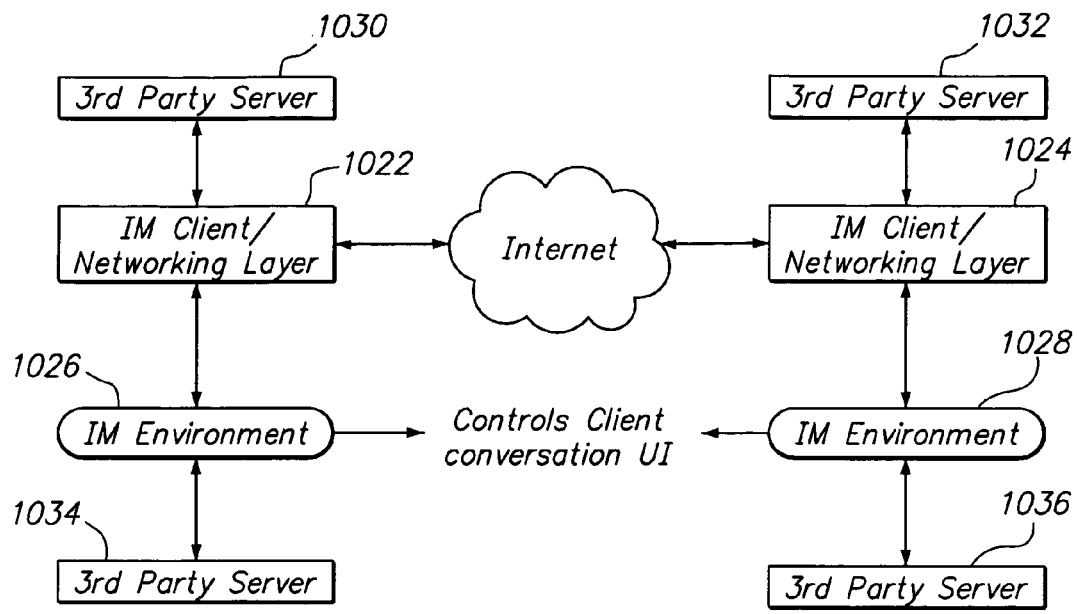
FIG. 9C is a diagram illustrating another embodiment of an instant messaging system using third-party servers.

FIG. 9C is a diagram illustrating another embodiment of an instant messaging system using third-party servers. IM clients/networking layers 1022, 1024 can implement IM environments 1026 and 1028, also executing IM applications which may be stored on third-party servers 1030, 1032, 1034, and 1036. Similarly, an IM session may be controlled or managed using client conversation user interfaces, similar to the conversation interfaces 1018, 1020 in FIG. 9B.

Figure 10:
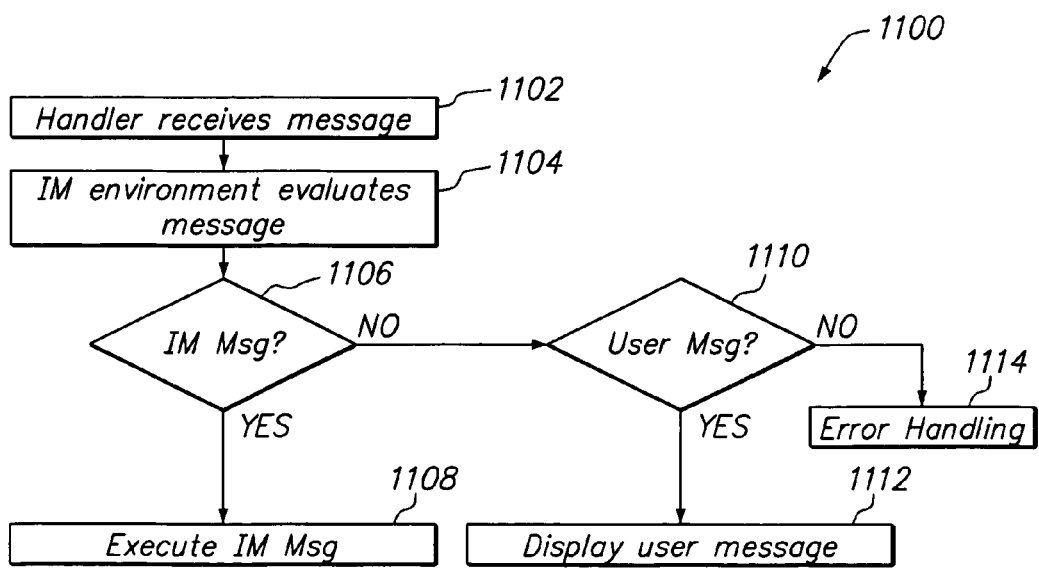
FIG. 10 is a flow chart illustrating an exemplary process 1100 for handling message-borne applications in an IM environment.

FIG. 10 is a flow chart illustrating an exemplary process 1100 for handling message-controlled applications in an IM environment. In the preferred embodiment, data and information passed between users in the form of a message. Applications and data may also be considered "messages" and can be passed between IM clients 202 as "IM messages." In step 1102, handlers in IM clients 202 receive messages. IM environments then evaluate the received message and determine an appropriate action for user and IM messages, as shown in step 1104. In step 1106, IM environments determine whether the message is an IM message. IM messages refer to messages useful in the execution and operation of IM applications. Conversely, messages between users (user messages) refer to communication messages between end users engaged in an IM session.

If an IM message is determined above, then an IM application (i.e. movie trailer, video, etc.) is executed. If the message is not an IM message, then IM environments determine whether the message is a user message in step 1110. If the message is a user message, then the message is displayed via IM client 202 on conversation user interface 204. If the message is neither an IM message nor a user message, then error handling is invoked, in step 1114.

Figure 11A:
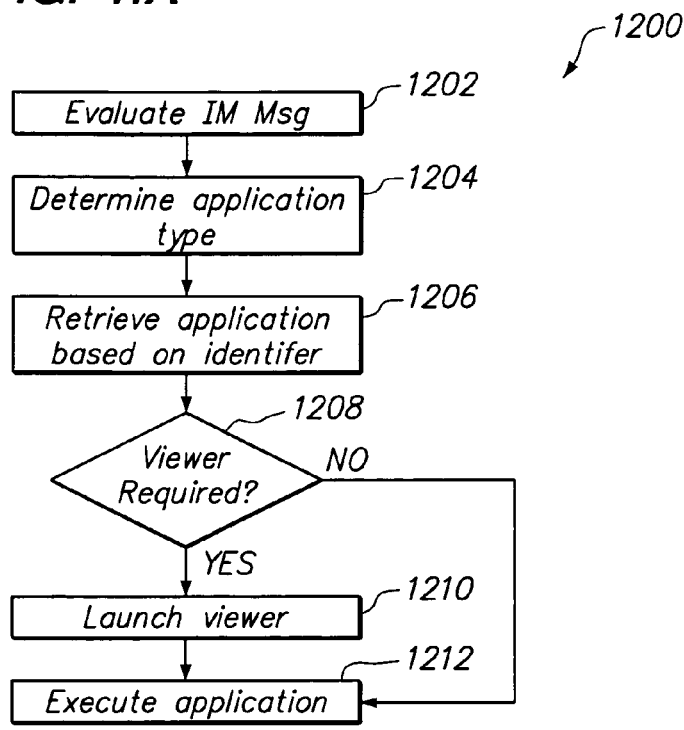
FIG. 11A is a flow chart illustrating the control and execution of IM applications in an instant messaging system, in accordance with one embodiment of the present invention.

FIG. 11A is a flow chart illustrating the control and execution of IM applications in an instant messaging system, in accordance with one embodiment of the present invention. In step 1202, IM client 202 (FIG. 1 or 10) evaluates an IM message. From the IM message, the IM client 202 determines the application type (i.e., movie trailer, game, animated cartoon, advertisement, Flash presentation, etc.) in step 1204. Using an identifier, the IM application is retrieved in step 1206. In step 1208, a decision is made as to whether a supporting application is required such as a media player (Real Player, Windows Media Player), content viewer (Adobe Illustrator, Reader, etc.), or other media-based display application. If required, the supporting application is launched in step 1210. If a supporting application is not required or if the supporting application has been launched, then the IM application is implemented/executed in step 1212. Alternative embodiments pertinent to the type of IM application implemented are shown in FIGS. 12B through 12D.

Figure 11B:
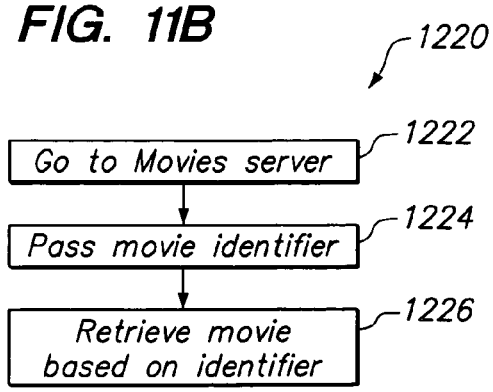
FIG. 11B is an exemplary flow chart for implementing a messenger-controlled IM application such as a movie trailer.

In FIG. 11B, an exemplary flow chart for implementing a messenger-controlled IM application such as a movie trailer is shown. In step 1222, the IM client 202 is directed to retrieve the identified IM application (e.g., a movie trailer) from a movie server such as IM application server 1002 (FIG. 9). A movie trailer identifier is passed to the movie server in step 1224. Based upon the identifier, a movie trailer or set of movie trailers may be retrieved in step 1226. Upon retrieving the movie trailer, IM client 202 then returns to step 1208 (FIG. 11A).

Figure 11C:
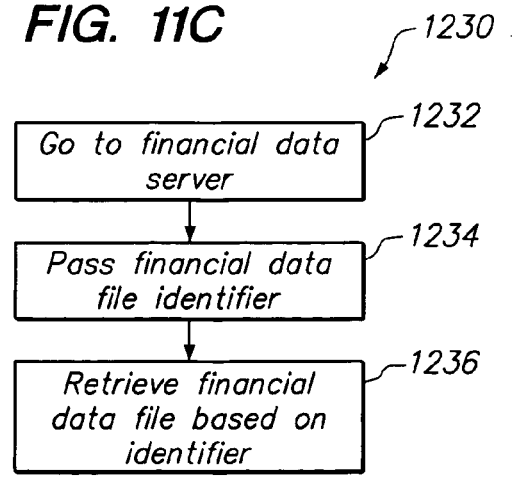
FIG. 11C is another exemplary flow chart for implementing a messenger-controlled IM application which yields financial data such as a stock quote, earnings indicator, or other financial data.

FIG. 11C illustrates another exemplary flow chart for implementing a messenger-controlled IM application which yields financial data such as a stock quote, earnings indicator, or other financial data. In step 1232, IM client 202 can be implemented using a server, database, RAID, storage disk, repository, etc. where the financial data application is stored. An identifier is passed, which identifies the specific financial data to be retrieved, such as a stock quote, public earnings figure, or other similar data in step 1234. The financial data is retrieved in step 1236 using the identifier passed by IM client 202.

FIG. 11D illustrates another exemplary flow chart for implementing a messenger-controlled IM application such as an audio file (e.g., song, recording, etc.). IM client 202 is directed to an audio server storing files of music, songs, recordings, etc. in various formats such as WAV files, MPEG3 files, etc. Passing an identifier to the audio server (i.e., IM application server 1002), IM client 202 can retrieve an audio file in step 1246. Subsequently, IM client 202 continues at step 1208 of the process illustrated in FIG. 11A.

FIG. 12 is a flow chart illustrating an exemplary IM application control process in accordance with one embodiment of the present invention. In step 1302, a user can direct IM client 202 to implement a control feature which will control an IM application. In the context of FIG. 12, a control message is similar to the above-discussed IM message. IM environment creates a control message in step 1304. The control message is sent to IM client 202 which implements the requested IM application, in step 1306.

FIG. 13A is an exemplary user interface for controlling IM applications in accordance with one embodiment of the present invention. A computer monitor screen 1400 is shown, containing a history window 1402. History window 1402 is similar to the history window 302 illustrated and discussed above in connection with FIG. 2. Within history window 302, browser control elements and features are shown. For example, in the embodiment shown several framed areas are provided. In the embodiment shown, several I-frames are provided including a conversation area 1404, content window 1406, a link frame 1408 and an application area 1410.

Control features such as those discussed in connection with the process flow chart of FIG. 12 may be included in any of the frames/windows shown. For example, in application area 1410, a graphic link may be provided which, when directed, executes an application which plays a movie trailer (in accordance with the process described above for FIG. 11B). In another example, a stock "ticker" may be played in application area 1410, displaying company symbols and financial stock quotes. Users can control IM applications using an interface similar to that shown in FIG. 13A (1400). In other embodiments, other techniques are used to implement control of messaging applications other than those described here and the embodiments listed above are intended to be neither comprehensive or inclusive of other applications that may be controlled from an IM environment.

Figure 13B:
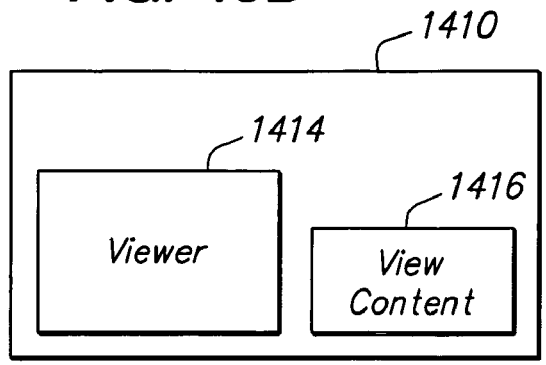
FIG. 13B illustrates another exemplary embodiment of application area 1410 for viewing content.

FIG. 13B illustrates another exemplary embodiment of application area 1410 for viewing content. A viewer window 1414 is provided for viewing or displaying content such as a movie trailer, film clip, animated story or advertisement, or video file in any of a number of formats including, but not limited to, MPEG4, Macromedia Flash, etc. A viewer button 1416 is provided which, when depressed, will launch an appropriate viewer/player, rendering the IM application/content for display to the user.

Figure 13C:
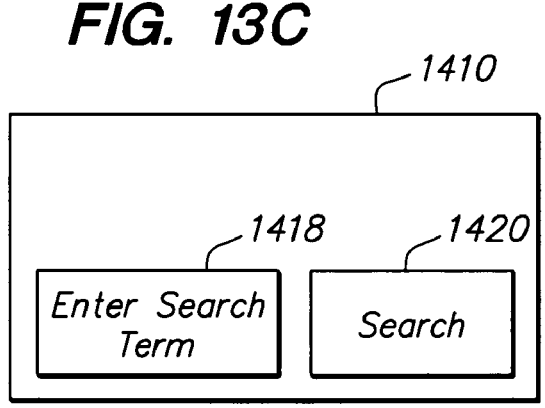
FIG. 13C illustrates another exemplary embodiment of application area 1410 for entering a search term and performing a search based on the search term.

FIG. 13C illustrates another exemplary embodiment of application area 1410 for entering a search term and performing a search based on the search term. In search term frame 1418, a user may enter a search term. After depressing search button 1420, an IM application is launched which executes the desired search based on the entered search term, returning and rendering the results in a frame on interface 1400. The frame may include, but is not limited to those shown in FIG. 13A. For example, returned search results may be included in content window 1406, application area 1410, or conversation area 1410. Search results and terms may be placed in frames other than those shown in the embodiments described herein.

Figure 13D:
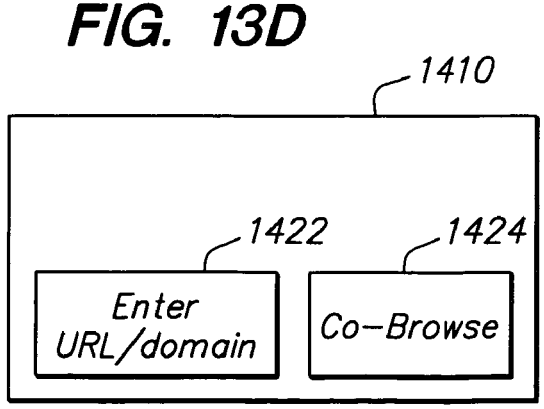
FIG. 13D illustrates another exemplary embodiment of application area 1410 for executing search functionality such as co-browsing, in an IM environment.

FIG. 13D illustrates another exemplary embodiment of application area 1410 for executing enhanced functionality such as co-browsing in an IM environment. Co-browsing, or two or more users browsing for online content while engaged in an IM environment, is provided for as a messenger-controlled IM application. URL/domain frame 1422 is configured to received a URL or domain name for pointing an IM application such as a web browser to a particular Internet or website. In one embodiment, the IM environment may launch a web browser once the co-browse button 1424 is depressed. Once a co-browsing session has been initiated, two or more users will be directed to the same Internet or website based upon the destination URL/domain name entered into URL/domain frame 1422. Browsers such as those provided by Microsoft (Internet Explorer), Netscape (Navigator), etc. may be used. Other internet browsing applications are used in other embodiments.

Control of IM applications such as co-searching, co-browsing, networked games, shared videos or audio files may be implemented in an automatic, semi-automatic, or manual manner. Information related to the control of IM applications uses IM messages which, when passed between IM clients, causes particular actions/interactions to occur between two or more IM users. The IM messages enable and control IM applications, which is widely varied in terms of functionality and user interactivity. IM applications may include co-searching, co-browsing, site navigation, co-drawing, media sharing (e.g., video, music, animation, photos, etc.), games, and activities in other embodiments. The IM applications can be hosted on servers communicating with the instant messaging clients, which may be operated by a variety of entities such as a content developer, hosted service, service provider, etc.

The following examples illustrate more embodiments of data sharing between IM applications. As used herein, the term "application" is intended to refer to any client application, server application, distributed application, self contained application or combination thereof. An application may be implemented in any appropriate manner, including being embedded in a chip or being loaded into memory or firmware. While this description refers extensively to instant messaging applications, the disclosed techniques can also be applied to other messaging applications or systems in different embodiments. In general, an instant messaging application refers to any real-time or near real-time messaging or information exchange application such as mobile phone messaging, wireless device messaging, etc. Instant messaging applications include applications that buffer messages sent to a participant who is temporarily unavailable or offline.

The techniques are applicable to messaging applications running on a variety of devices, including personal computers, handheld devices, mobile telephones, wireless devices or any other appropriate platforms and/or systems. Throughout this specification, for ease of reference, the Internet is referred to as a medium over which messages are sent, although other mediums can also be used. The disclosed system also operates over any other appropriate network or internetwork including wireless networks, proprietary networks, intranets, local area networks, or wide area networks.

Figure 14:
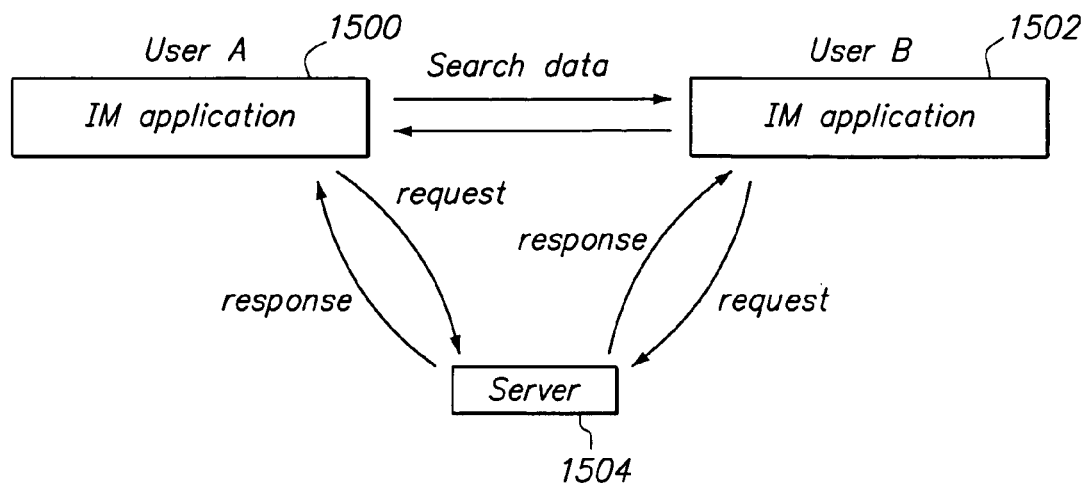
FIG. 14 is a diagram illustrating the sharing of data in an instant messaging environment according to one embodiment.

FIG. 14 is a diagram illustrating the sharing of data in an instant messaging environment according to one embodiment. In this example, User A and User B communicate with each other using IM applications 1500 and 1502 respectively. The IM environment provides the users with a cooperative experience without requiring the users to view exactly the same content. In the following examples, techniques for cooperative searches are discussed in detail for the purposes of illustration. The same techniques are also applicable to other cooperative IM functions such as co-browsing or co-gaming. Also for the purposes of illustration, in the following examples, User A initiates a search and shares the search with User B, although the same techniques can be applied to a search initiated and shared by User B or any other users.

In this example, User A uses his IM application to send a search request to a server 1504. The server may be a database server, an application server, a search engine, or any other appropriate systems that can provide a response to the search request. The server may also be a cluster server that includes multiple machines. In some embodiments, server 1504 directly provides a search result in response to the search request. In some embodiments, server 1504 functions as a gateway or interface for the search. In these systems, server 1504 relays the request to another server or device that provides the search results, and relays the response provided by the other device to the IM application that makes the request. User A can share the search with User B by sending search data from IM application 1500 to IM application 1502. The search data includes information associated with the search results and is discussed in more detail below. Similarly, if User B chooses to share a search with User A, search data is then sent from IM application 1502 to IM application 1500.

Figure 15:
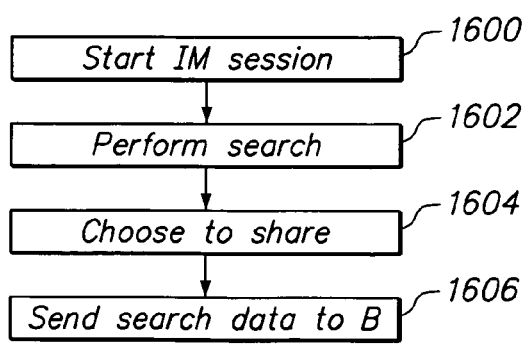
FIG. 15 is a flowchart illustrating a process for sharing a search according to one embodiment.

FIG. 15 is a flowchart illustrating a process for sharing a search according to one embodiment. In this example, an IM session is started (1600). An IM session may be started, for example, by exchanging a message between the two users. While the IM session is in progress, User A performs a search (1602). In some embodiments, User A enters a search term in his IM application. The search term may include one or more words, phrases, or any other appropriate symbols or notations that can be used to conduct a search. The search term is transferred to a server such as server 1504 shown in FIG. 14. A response that includes the results of the search is transferred from the server to User A's IM application. The IM application may reformat the search results received and display the search results to User A.

User A then chooses to share the search with User B (1604). Search data is transferred from User A's IM application to User B's IM application (1606). The search data includes information that allows User B's IM application to obtain approximately the same search results as the ones shown to User A. The search data includes the search results obtained by User A's IM application in some embodiments, and the search results are displayed on User B's IM application directly. Preferably, the search data includes a compressed representation of the search results. A compressed representation of the search result refers to a relatively small amount of data that can be used to recover or reconstruct approximately the same search results. In some examples, the compressed representation includes the search term. In some embodiments, the compressed representation includes identifiers for the items found in the search result. The compressed representation of the search results includes fewer bytes than the search result in most situations, although there are exceptions when the size of the compressed representation is greater than the search results. For example, the search term may be long and there may be few items in the search result.

Figure 16:
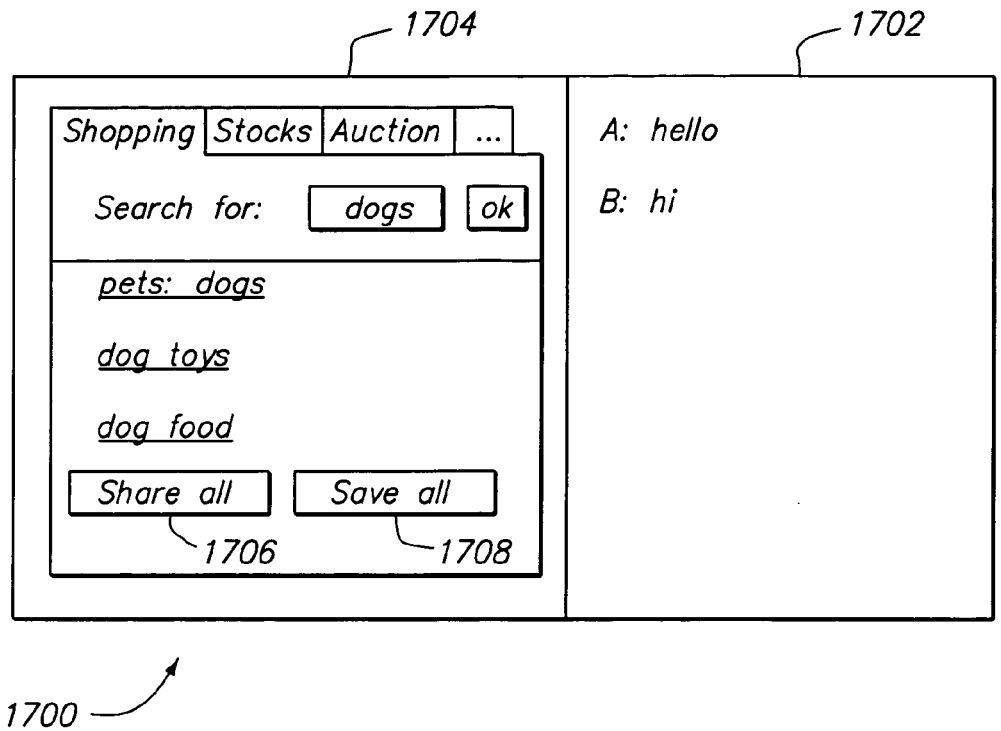
FIG. 16 illustrates an instant messaging application user interface used for performing a search, according to one embodiment.

FIG. 16 illustrates an instant messaging application user interface used for performing a search, according to one embodiment. In this example, user interface display 1700 includes a conversation area 1702 and a user specific area 1704. Conversation area 1702 displays the conversation between the two users. User specific area 1704 provides contexts such as browsing, shopping, participating in auctions, researching stocks, etc. that are controlled by the user of the IM application. The user may select and use a context while the conversation is in progress. In this example, User A selects the shopping context and enters a search term "dog". The search term is sent to a shopping server, which matches the search term with items available for sale. In this example, the items are displayed as hyperlinks such as "pets: dog", "dog toys", "dog food", etc. The user may obtain more information about the item by selecting its corresponding hyperlink. For example, selecting a link of an item may cause a web page associated with the item to be displayed. In some embodiments, the IM application cooperates with an e-commerce server, giving the user the ability to put items in the shopping cart by clicking on the item displayed. User A may choose to share the search with User B by selecting a "share all" button 1706. In this embodiment, rather than sending the search results to User B, the search term "dogs" is included in the search data sent to User B. This compressed representation reduces the amount of data to be transferred to User B, and allows the most up-to-date search result information to be displayed for User B later. In some embodiments, rather than sharing the entire search, User A can selectively share individual items.

User A can also choose to save the search. In some embodiments, the information is saved on User A's device locally. In some embodiments, the information is saved on a server. In some embodiments, the same information included in the search data is saved. In this example, selecting "save all" button 1708 saves the search term "dog". If User A later wants to view the search results for dogs, he can select the saved search. A new search using the saved search term is then performed and the most up-to-date information is displayed. In some embodiments, User A can selectively save individual items in the search results.

Figure 17:
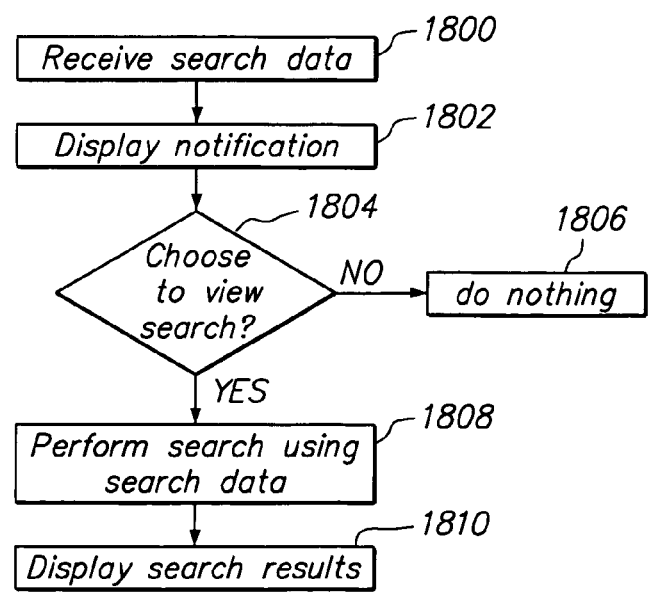
FIG. 17 is a flowchart illustrating a process for displaying shared search results according to one embodiment.

FIG. 17 is a flowchart illustrating a process for displaying shared search results according to one embodiment. In this example, search data is transferred from User A's IM application and received by User B's IM application (1800). A notification is displayed to User B, indicating to User B that User A wishes to share a search (1802). User B is given the option to view the search (1804). If User B chooses to view the search, a new search is performed using information in the search data, such as the search term (1806). The search results are then displayed to User B (1808). If User B does not choose to view the search, no additional step is required and the search results are not displayed (1810).

Figure 18:
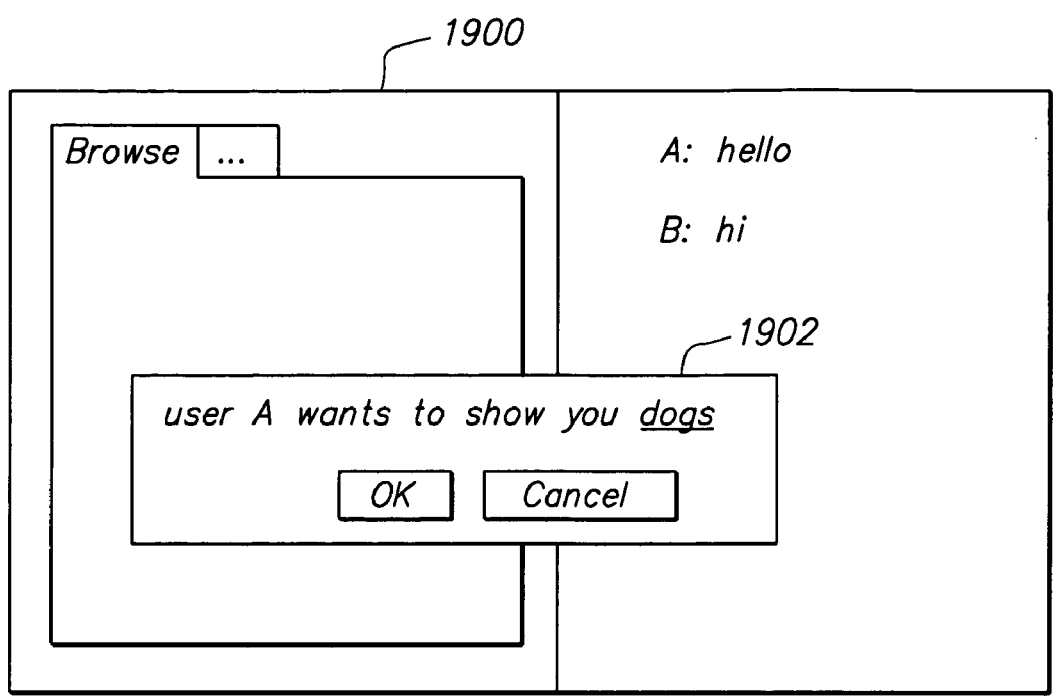
FIG. 18 is a diagram illustrating a user interface for displaying a shared search according to one embodiment.

FIG. 18 is a diagram illustrating a user interface for displaying a shared search according to one embodiment. In this example, upon receiving the search data (1800 of FIG. 17), User B's IM application creates a pop up window 1902. Window 1902 shows User B a notification, indicating to User B that User A would like to show User B information on "dogs" (1802). In the example shown, the search term "dogs" is embedded in the notification as a hyperlink to the server. In some embodiments, the notification may include a URL. For example, if User A chooses to share a single item rather than the entire search, the URL for the item is then transferred to User B and displayed in the notification. In some embodiments, once User B selects the URL, User A and User B enter a co-browsing mode to view the same web page.

User B may choose to view details of the search by clicking on the "OK" button or the search term "dogs" (1804). If User B clicks on OK or on the search term "dogs", a new search based on the search term "dogs" is then performed by sending the search term to a server such as server 1504 shown in FIG. 14. The search results are then displayed to User B in window 1900.

The techniques discussed above are applicable to other aspects of the IM environment besides shopping. For example, users may share their search results in stocks, auction, news, movies or any other IM application contexts or categories that allow for search. The search data in some embodiments includes an indicator that identifies the search category. The IM application of the search data recipient can obtain the search results by performing a search according to the category corresponding to the indicator.

Techniques for sharing data have been described. In addition to being used in instant messaging sessions between two users, the techniques described herein are also applicable to instant messaging or chat sessions that include three or more users.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for sharing data in a messaging environment, comprising:
    transferring a first search result for a search, based on a particular set of search terms, from a first application on a first client to a first instant messaging environment on the first client;
    in response to user input received by the first instant messaging environment:
        transferring search data associated with the search over a network to a second instant messaging environment on a second client; and
        causing a control to be presented in the second instant messaging environment on the second client;
    in response to user selection of the control presented in the second instant messaging environment:
        transferring said search data from said second instant messaging environment on the second client to a second application on said second client;
        transferring a second search result from said second application to said second instant messaging environment; and
        providing, in the second instant messaging environment, said second search result based on the search data, wherein the second search result reflects a search that was performed based said particular set of search terms.

2. A method for sharing data in a messaging environment as recited in claim 1, wherein the search data includes the first search result.

3. A method for sharing data in a messaging environment as recited in claim 1, wherein the search data includes a compressed representation of the first search result.

4. A method for sharing data in a messaging environment as recited in claim 1, wherein the search data includes the particular set of search terms.

5. A method for sharing data in a messaging environment as recited in claim 1, further comprising:
    in response to user input received by the first instant messaging environment prior to transferring the first search result:

causing the first application to perform the search using the particular set of search terms to obtain the first search result, and wherein in response to user selection of the control presented in the second instant messaging environment the following further step is performed:

causing the second application to perform a second search using the search data to obtain the second search result.

6. A method for sharing data in a messaging environment as recited in claim 5, wherein:

the first search result is approximately the same as the second search result.

7. A method for sharing data in a messaging environment as recited in claim 1, further comprising:

in response to user input received by the first instant messaging environment prior to transferring the first search result:

causing the first application to perform the search using the particular set of search terms to obtain the first search result, wherein the first application sends a search request to a server.

8. A method for sharing data in a messaging environment as recited in claim 1, further comprising displaying the first search result, wherein an item in the first search result is shown as a hyperlink.

9. A method for sharing data in a messaging environment as recited in claim 1, further comprising:

displaying the first search result;

selecting an item in the first search result and placing the item in a shopping cart.

10. A method for sharing data in a messaging environment as recited in claim 1, further comprising displaying a notification on the second instant messaging environment, wherein the notification comprises the control.

11. A method for sharing data in a messaging environment as recited in claim 1, wherein the search is performed within a search context of shopping.

12. A method for sharing data in a messaging environment as recited in claim 1, wherein the search is performed within a search context of auction.

13. A method for sharing data in a messaging environment as recited in claim 1, wherein the search is performed within a search context of news.

14. A method for sharing data in a messaging environment as recited in claim 1, wherein the search is performed within a search context of stocks.

15. A method for sharing data in a messaging environment as recited in claim 1, wherein the messaging environment is an instant messaging environment.

16. A method for sharing data in a messaging environment as recited in claim 1, wherein the first application runs on a mobile device.

17. A method for sharing data in a messaging environment as recited in claim 1, wherein the second application runs on a mobile device.

18. A method for sharing data in a messaging environment as recited in claim 1, further comprising displaying a web page associated with the search in the first instant messaging environment and wherein the step of providing, in the second instant messaging environment, a second search result based on the search data comprises displaying the web page in the second instant messaging environment.

19. The method of claim 1 wherein:

the method further comprises receiving user input that specifies a subset of the first search result; and the only part of the first search result that is included in the second search result is the first subset of the first search result.

20. A system for sharing data, comprising:

a first client and a second client;

said first client comprising:

a first processor;

a first memory having first instructions stored therein, said first memory coupled to the first processor;

wherein when said first processor executes the first instructions said first processor performs the following operations:

perform a search in a first application, based on a particular set of search terms, to obtain a first search result;

transfer the first search result from the first application to a first instant messaging environment; and in response to user input received by the first instant messaging environment:

transfer search data associated with the search to a second instant messaging environment on the second client;

said second client comprising:

a second processor;

a second memory having second instructions stored therein, said second memory coupled to the second processor;

wherein when said second processor executes the second instructions said second processor performs the following operations:

respond to the search data transferred from the first instant messaging environment to the second instant messaging environment by causing a control to be presented in the second instant messaging environment on the second client;

in response to user selection of the control presented in the second instant messaging environment:

transfer said search data from said second instant messaging environment on the second client to a second application on said second client;

transfer a second search result from said second application to said second instant messaging environment; and provide, in the second instant messaging environment, said second search result based on the search data, wherein the second search result reflects a search that was performed based said particular set of search terms.

21. A computer program product for sharing data, the computer program product being embodied in a computer readable medium and comprising computer instructions for:

transferring a first search result for a search, based on a particular set of search terms, from a first application to a first instant messaging environment on a first client;

in response to user input received by the first instant messaging environment:

transferring search data associated with the search to a second instant messaging environment on a second client;

causing a control to be presented in the second instant messaging environment on the second client;

in response to user selection of the control presented in the second instant messaging environment:

transferring said search data from said second instant messaging environment on the second client to a second application on said second client;

transferring a second search result from said second application to said second instant messaging environment; and providing, in the second instant messaging environment, said second search result based on the search data.

* * * * *